(No Model.)
R. DEAN.
PROCESS OF AND APPARATUS FOR THE FRACTIONAL DISTILLATION OF PETROLEUM.
No. 310,497. Patented Jan. 6, 1885.
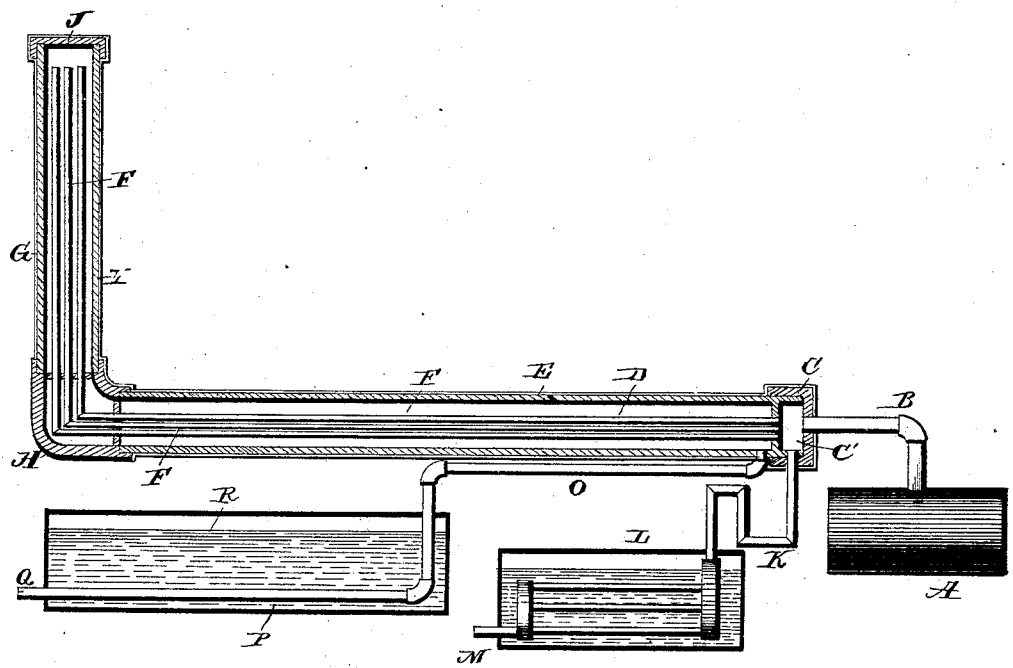
WITNESSES
INVENTOR
Richard Dean.
By Leggett & Leggett
Attorney.

UNITED STATES PATENT OFFICE.

RICHARD DEAN, OF CLEVELAND, OHIO, ASSIGNOR TO JOSEPH B. MERIAM, OF SAME PLACE.

PROCESS OF AND APPARATUS FOR THE FRACTIONAL DISTILLATION OF PETROLEUM.

SPECIFICATION forming part of Letters Patent No. 310,497, dated January 6, 1885.

Application filed July 14, 1883. Renewed December 15, 1884. (No model.)

*To all whom it may concern:*

Be it known that I, RICHARD DEAN, of Cleveland, in the county of Cuyahoga and State of Ohio, have invented certain new and useful Improvements in the Process of and Apparatus for the Fractional Distillation of Petroleum; and I do hereby declare the following to be a full, clear, and exact description of the invention, such as will enable others skilled in the art to which it appertains to make and use the same.

My invention relates to an improved process of and apparatus for the fractional distillation of petroleum and other oils, the object being to simplify and to reduce the expense of such distillation and to produce distillates of very high test.

With these objects in view my invention consists in a process for the fractional distillation of petroleum and other oils, consisting in utilizing a portion of the vapor generated in a still for respectively maintaining the vaporization of and condensing other portions of other volumes of vapor generated in the same still.

My invention further consists in apparatus for carrying out the above process.

In the accompanying drawing, the figure is a view in vertical longitudinal section of an apparatus constructed in accordance with my invention.

Before proceeding with the description of the apparatus, and that the same may be more clearly understood, I will explain the principle of operation involved in the invention.

It is well known that the vapors of the different grades of distillates are evolved at different temperatures, the vapors of the higher-test distillates being evolved at high temperatures, and those of the low-test distillates at temperatures correspondingly low. These vapors respectively condense in the presence of temperatures below those at which they are developed. If, therefore, a volume of vapor is brought into the presence of a temperature lower than the temperature at which the vapor of the high-test distillate contained in it is evolved, but higher than the temperature at which the remaining vapors are generated, the vapor of the high-test distillate will be condensed, while the vapors of the remaining distillates will be sustained in a condition of vapor.

My invention comprehends the application of the above principle of operation to the fractional distillation of petroleum by employing a portion of the vapor generated in a still as a bath for respectively maintaining the vaporization of and condensing other portions of other volumes of vapor generated in the same still.

With reference, now, to the construction of the apparatus, A is a prime still of any approved type. It is connected by a suitable goose-neck, B, to a cap, C, inclosing the primary condensing-chamber D, and fitting over one end of the horizontal arm E of the vapor-bath condenser. The said chamber D does not, however, communicate with the condenser except through the pipes F, as will be hereinafter described. The said condenser consists of the horizontal arm E and a vertical arm, G, the said arms being attached to and intersecting through an elbow, H, provision being made in the attachment of the arms to the elbow for the contractions and expansions following oscillations in the temperatures of the arms, which are inclosed in envelopes I, of suitable non-conducting material, to prevent the radiation of heat. As to the particular construction of the arms, they are composed of heavy iron cylinders having a diameter of about ten inches, and respectively of about twenty and ten feet in length. These dimensions are, however, only approximate, and may be allowed considerable latitude of variation. The pipes F, which are about one and one-half inch in diameter, are supported by suitable means in the center of the vapor-bath condenser. Their lower ends open into the chamber D, while their upper ends terminate just below the upper end of the arm G, which is closed by a cap, J. That portion of the vapor which is condensed in the pipes gravitates into the chamber C', from which, with the vapor condensed therein, it flows into the trap K, and thence into the manifold L, wherein it is cooled and drawn off through the outlet M. The cooling of the condensed distillate is effected by submerging the manifold in a vessel filled with water. That portion of the vapor which fails to condense either in the chamber C' or in the pipes F emerges from the upper ends of the latter and returns through the whole length of the condenser and passes into the conduit O, by which it is conveyed to a condenser, P, and drawn off through the outlet Q, the condenser being submerged in a vessel, R, filled with water.

Having fully set forth the construction of my improved apparatus, I will proceed to describe the method of its operation. The vapor rising from the still is conveyed by the goose-neck to the primary condensing-chamber. That portion of the vapor condensed in this chamber finds an outlet through the trap, from which it flows to the manifold. The remaining vapor passes through the pipes grouped in the center of the vapor-bath condenser, as before described, a portion of it being condensed in the transit through them. The vapor condensed in the pipes is discharged therefrom into the primary chamber, from which it finds its way into the manifold, wherein it is cooled. The distillates thus collected in the manifold are of very high test, being wholly free from mixture with distillates occupying a lower position in the test-scale. So much of the vapor as fails to condense in the pipes emerges from their upper ends and returns through the entire length of the vapor-bath condenser and escapes into the water-condenser, wherein it is condensed and drawn off as a distillate of low test. In its return transit through the condenser the uncondensed vapor entirely surrounds the pipes and imparts a portion of its heat to them, acting in this capacity as a bath for condensing all portions of the vapors in transit through the pipes which were evolved in the still at a higher temperature than that to which they are heated, and for maintaining in a condition of vapor such portions of the vapors passing through the pipes as were evolved below the temperature of the bath. It is in this manner that a portion of the vapor generated in a still is employed for respectively maintaining the vaporization of and for condensing other portions of other volumes of vapor generated in the same still. By means of the vapor bath the temperature of the condenser is sustained much above that of boiling water. The positions of the distillates upon the test-scale will be high or low, according as their condensation is effected at a temperature near or below the temperatures at which their vapors are evolved in the prime still. The quality of the distillates will therefore be determined by the temperature at which the condenser is operated, and this temperature is regulable within certain limits.

The condenser herein shown is capable of separating the vapors into only two classes of distillates, one being of very high and the other of low test. If desired, however, two or more of the condensers may be arranged to have the vapor passed progressively through them. In case a series of condensers is employed, they will be operated upon a declining scale of temperatures respectively determined by the quality of the distillates to be condensed in the several condensers. By thus employing several condensers and sustaining them at temperatures just below those at which the different grades of distillates are vaporized, a very perfect separation of the oil may be obtained, with clear lines of demarkation between the different grades.

Aside from the advantages which the apparatus offers for the fractional distillation of petroleum, it is commended by the simplicity of its construction and the ease of maintaining it in operative condition. The utilization of a portion of the vapor as a bath for sustaining the heat in the condenser is also an important economical factor of my improved process.

I am aware a condenser has been provided with a vapor-conduit inclosed by return-tube of larger diameter, whereby the vapor coming in contact with the closed end of the outer tube will be partly condensed and flow downwardly between the two tubes into a receptacle, while the remaining vapors flow upwardly and impinge against cool surfaces and are condensed thereon; and hence I would have it understood that I make no claim to such construction or arrangement of parts. In my improvement the vapors pass through pipes, (one or more,) and the uncondensed vapors are conducted backwardly in direct contact with said pipes and form the sole condensing-bath therefor, and from thence are conducted to a condensing-coil. The return-flow of uncondensed vapor serves to condense a portion of the vapor flowing through the pipes, the condensed vapor being drawn off from said pipes in a direction opposite to that of the flow of the vapor.

Having fully described my invention, what I claim as new, and desire to secure by Letters Patent, is—

1. In the fractional distillation of petroleum, the process hereinbefore described, consisting in passing the vapor from the still through condensing tubes or conduits, (one or more,) and conducting the uncondensed vapors backwardly in direct contact with said tubes or conduits, and thence into a condenser, whereby the uncondensed vapor serves as the sole condensing bath or medium for the vapor coming from the still, and drawing off the liquid condensed in said primary condensing tubes or conduits, substantially as set forth.

2. In an apparatus for the fractional distillation of petroleum, the combination, with a still and condensing tubes or conduits (one or more) communicating therewith, of a chamber inclosing said condensing tubes or conduits, and constructed and arranged to convey the uncondensed vapor issuing from the said tubes or conduits backwardly in direct contact therewith, and constitute the sole condensing medium therefor, a condenser connected with said inclosing-chamber, and pipes for drawing off the liquid from the condensing tubes or conduits, substantially as set forth.

3. In an apparatus for the fractional distillation of petroleum and other oils, the combination, with a still and a series of condensing pipes or conduits communicating at one end with the still, and open at their opposite ends, and arranged substantially horizontally for a portion of their length, and substantially vertically for the remaining portion, of an inclosing-chamber closed at its outer end, and separate discharge-pipes communicating, respectively, with the series of condensing-pipes and with the inclosing-chamber, substantially as set forth.

In testimony whereof I have signed this specification in the presence of two subscribing witnesses.

RICHARD DEAN.

Witnesses:
 OSCAR J. CAMPBELL,
 J. B. MERIAM.